United States Patent
Ishiwata

(10) Patent No.: US 8,204,370 B2
(45) Date of Patent: Jun. 19, 2012

(54) IMAGE PICKUP APPARATUS, FOCUS CONTROL METHOD AND FOCUS CONTROL PROGRAM

(75) Inventor: Hisashi Ishiwata, Tokyo (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 12/431,020

(22) Filed: Apr. 28, 2009

(65) Prior Publication Data

US 2009/0322932 A1    Dec. 31, 2009

(30) Foreign Application Priority Data

Jun. 26, 2008   (JP) ................................. 2008-167669

(51) Int. Cl.
*G03B 13/18*     (2006.01)
(52) U.S. Cl. .......................................... 396/89; 348/353
(58) Field of Classification Search .................. 348/345, 348/353; 396/89
See application file for complete search history.

(56) References Cited

U.S. PATENT DOCUMENTS

| | | | | |
|---|---|---|---|---|
| 5,757,429 | A * | 5/1998 | Haruki | 348/354 |
| 7,382,411 | B2 * | 6/2008 | Watanabe | 348/349 |
| 7,725,018 | B2 * | 5/2010 | Konishi | 396/102 |
| 7,773,146 | B2 * | 8/2010 | Suda | 348/354 |

FOREIGN PATENT DOCUMENTS

| | | |
|---|---|---|
| JP | 1-140190 | 6/1989 |
| JP | 3-229209 | 10/1991 |
| JP | 5-308557 | 11/1993 |
| JP | 2002-122773 | 4/2002 |
| JP | 2002-207162 | 7/2002 |
| JP | 2006-11068 | 1/2006 |
| JP | 2006-65355 | 3/2006 |
| JP | 2007-206433 | 8/2007 |
| JP | 2007-219390 | 8/2007 |
| JP | 2008-281701 | 11/2008 |
| JP | 2009-169124 | 7/2009 |

* cited by examiner

*Primary Examiner* — Clayton E Laballe
*Assistant Examiner* — Linda B Smith
(74) *Attorney, Agent, or Firm* — Oblon, Spivak, McClelland, Maier & Neustadt, L.L.P.

(57) ABSTRACT

An image pickup apparatus includes: an in-focus operation section configured to drive a focus lens to move over a predetermined driving range in order to detect evaluation values each representing the strength of the contrast of an image signal generated based on a subject of an image pickup operation from a plurality of predetermined positions and find an in-focus position of the focus lens based on the evaluation values; a detector configured to acquire first evaluation values obtained for the predetermined positions during a first period of driving the focus lens to move over the predetermined driving range, and second evaluation values obtained for at least one of the predetermined positions during a second period between the end of the first period and a process to find the in-focus position based on the first evaluation values; and a change measurement section configured to measure a change of the evaluation value.

11 Claims, 15 Drawing Sheets

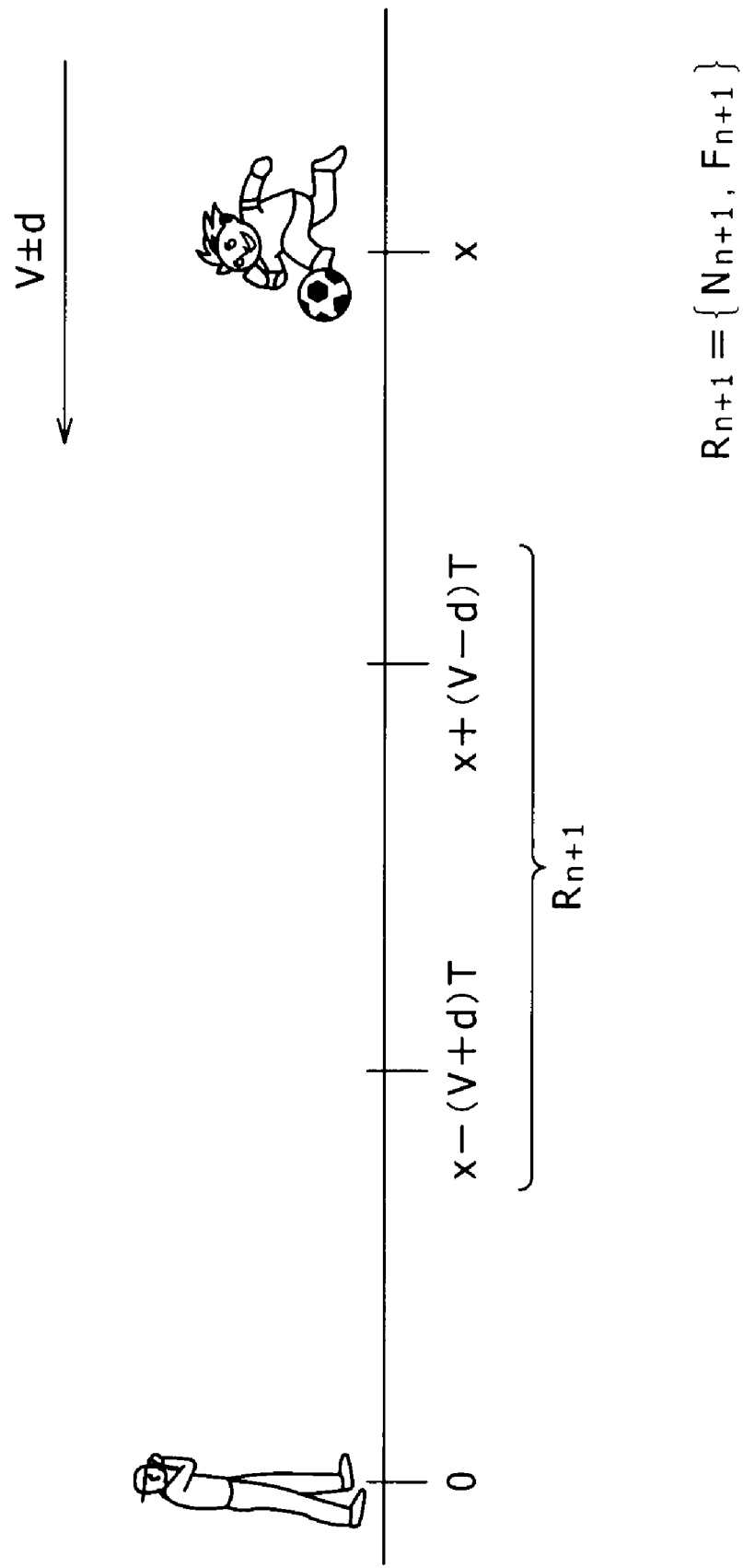

IMAGE PICKUP APPARATUS, FOCUS CONTROL METHOD AND FOCUS CONTROL PROGRAM

BACKGROUND OF THE INVENTION

1. Field of the Invention

The present invention relates to an image pickup apparatus which adjusts the focus of a focus lens employed therein by measuring the contrast of an image of a subject while moving the focus lens, determines a position at which the strength of the measured contrast is maximized on the basis of changes of the strength of the contrast and move the focus lens to the position. The present invention also relates to a focus control method provided for the image pickup apparatus and relates to a focus control program implementing the focus control method.

2. Description of the Related Art

Focus control techniques include a method for determining whether the contrast of picked-up image data acquired through a lens is high or low. This focus control method is based on the concept of assuming that an image having high contrast is an image taken in an in-focus state. This method is referred to hereafter as an imager AF (Auto Focus) method. More concretely, in accordance with the imager AF method, high-frequency components of a specific area are extracted, integrated data of the extracted high-frequency components is generated and the generated integrated data of the extracted high-frequency components is used for determining whether the contrast of the picked-up image is high or low. That is to say, the focus lens is moved to a plurality of positions in order to take the same plurality of images and, then, a luminance signal of each picked-up image is subjected to filter processing such as mainly an HPF (High Pass Filter) so as to obtain an evaluation value of the strength of the contrast of every picked-up image. In the following description, the evaluation value is also referred to as an AF value.

For example, FIG. 15 is a diagram showing a curve representing the relation between evaluation values and focus-lens positions on both sides of a just in-focus position which is defined as a position at which a subject of an image pickup operation is located in an in-focus state. A position $P_1$ of the peak of the curve is the just in-focus position. At the just in-focus position $P_1$, the evaluation value representing the contrast of the picked-up image of the subject of an image pickup operation is maximized. In accordance with such a focus control method, the focus operation can be carried out on the basis of only information of an image taken by the imager and a distance measurement optical system is not required in addition to an image pickup optical system. Thus, the focus control method is adopted in a number of contemporary digital cameras.

The auto focus operation adopting the imager AF method is carried out continuously. In the auto focus operation carried out continuously, the distance of a movement made by the subject of the image pickup operation at the next operation is estimated from information on distances obtained along a series of times in the past as the distances of movements made by the subject of the image pickup operation. Then, an auto focus operation aimed at surroundings of the subject of the image pickup operation is also carried out. This operation is referred to as a dynamic-body tracking AF operation. That is to say, in the dynamic-body tracking AF operation, the focus is adjusted by keeping track of the subject of the image pickup operation because the subject is moving. In the dynamic-body tracking AF operation, while the velocity of the movement made by the subject of the image pickup operation and the estimation precision are being taken into consideration, as narrow a range as possible is determined by adoption of a technique described below so that a wide range is not scanned wastefully.

For example, as shown in a diagram of FIG. 16, the limits of the scan range $R_{n+1}(=\{N_{n+1}, F_{n+1}\})$ of the focus lens in an (n+1)th AF operation are expressed by Eqs. (4) and (5) given below:

$$N_{n+1} = x - (V+d)T \tag{4}$$

$$F_{n+1} = x + (V-d)T \tag{5}$$

Reference notations used in the above equations are used for denoting quantities that exist at the end of the Nth AF operation as follows. Reference notation x denotes an estimated distance between in-focus positions whereas reference notation V denotes the estimated velocity of the subject of the image pickup operation. Reference notation d denotes an estimated error of the velocity of the subject of the image pickup operation whereas reference notation T denotes an interval between two adjacent AF operations.

Japanese Patent Laid-open Nos. Hei 03-229209 and Hei 01-140190 are used in this invention specification.

SUMMARY OF THE INVENTION

By the way, in the imager AF operation, in order to obtain an evaluation value representing the strength of the contrast described above, it is necessary to carry out processes (i) to (iii) at three stages. Process (i) at the first stage is the exposure process of the imager. Process (ii) at the second stage is a process carried out by a detector to detect a luminance signal. Process (iii) at the last stage is a process of transferring data detected in process (ii) to an area which can be referenced by software.

Normally, a plurality of control periods are required for carrying out processes (i) to (iii). Thus, in a dynamic-body tracking AF operation executed by carrying out an imager AF operation continuously, it is not always possible to move a focus lens to the start position of the next scan when the present scan is ended. That is to say, until the present evaluation values are all obtained, the computation of an in-focus position is ended and the present distance between in-focus positions is found, it is necessary to hold the focus lens or put the focus lens in a standby state at a position determined in advance.

As is obvious from Eqs. (4) and (5), if the necessary interval T between two successive scans can be reduced, it is expected that the scan range required in each AF operation can be decreased so that the response speed of image pickup apparatus can be increased.

In order to solve the problems raised by the existing image pickup apparatus as described above, inventors of the present invention have innovated an image pickup apparatus having a response speed increased by essentially shortening the interval T. The inventors of the present invention have also innovated a focus control method provided for the image pickup apparatus and a focus control program implementing the focus control method.

An image pickup apparatus according to an embodiment of the present invention employs: an in-focus operation section configured to drive a focus lens to move over a driving range determined in advance in order to detect evaluation values each representing the strength of the contrast of an image signal generated on the basis of a subject of an image pickup operation from a plurality of positions determined in advance and find an in-focus position of the focus lens on the basis of the evaluation values; a detector configured to acquire first evaluation values obtained for the positions determined in advance during a first period of driving the focus lens to move over the driving range determined in advance, and second evaluation values obtained for at least one of the positions determined in advance during a second period between the end of the first period and a process carried out by the in-focus operation section to find the in-focus position of the focus lens on the basis of the first evaluation values; and a change measurement section configured to measure a change of the evaluation value on the basis of the second evaluation value and the first evaluation value obtained for the position of the second evaluation value. In the image pickup apparatus, the in-focus operation section determines the next driving range of the focus lens on the basis of the in-focus position found from the first evaluation values and on the basis of the change of the evaluation value.

A focus control method according to another embodiment of the present invention includes: an evaluation-value acquisition step of acquiring first evaluation values each representing the strength of the contrast of an image signal generated on the basis of a subject of an image pickup operation from a plurality of positions determined in advance during a first period of driving a focus lens to move in a driving range determined in advance, and second evaluation values obtained for at least one of the positions determined in advance during a second period between the end of the first period and a process carried out by an in-focus operation section to find an in-focus position of the focus lens on the basis of the first evaluation values; a change measurement step of measuring a change of the evaluation value on the basis of the second evaluation value and the first evaluation value obtained for the position of the second evaluation value; and a driving-range determination step carried out by the in-focus operation section to determine the next driving range of the focus lens on the basis of the in-focus position found from the first evaluation values and on the basis of the change of the evaluation value.

A focus control program provided by further embodiment of the present invention to serve as a program to be executed by a computer to carry out: an evaluation-value acquisition step of acquiring first evaluation values each representing the strength of the contrast of an image signal generated on the basis of a subject of an image pickup operation from a plurality of positions determined in advance during a first period of driving a focus lens to move in a driving range determined in advance, and second evaluation values obtained for at least one of the positions determined in advance during a second period between the end of the first period and a process carried out by an in-focus operation section to find an in-focus position of the focus lens on the basis of the first evaluation values; a change measurement step of measuring a change of the evaluation value on the basis of the second evaluation value and the first evaluation value obtained for the position of the second evaluation value; and a driving-range determination step carried out by the in-focus operation section to determine the next driving range of the focus lens on the basis of the in-focus position found from the first evaluation values and on the basis of the change of the evaluation value.

In accordance with the present invention, the period to sample distance information in an operation to let the position of a focus lens employed in an image pickup apparatus change by keeping track of a dynamic body serving as a subject of an image pickup operation carried out by the image pickup apparatus is shortened in order to increase the frequency to update the inferred velocity of the dynamic body. Thus, the scan range is limited so that the response speed of the image pickup apparatus can be raised. In this invention specification, the distance information means the distance between in-focus positions determined in two successive scan operations.

BRIEF DESCRIPTION OF THE DRAWINGS

These and other innovations as well as features of the present invention will become clear from the following description of the preferred embodiments given with reference to the accompanying diagrams, in which:

FIG. 16 is an explanatory diagram to be referred to in description of a typical method for finding a scan range in operation tracking AF processing.

DETAILED DESCRIPTION OF THE PREFERRED EMBODIMENT

Figure 1:
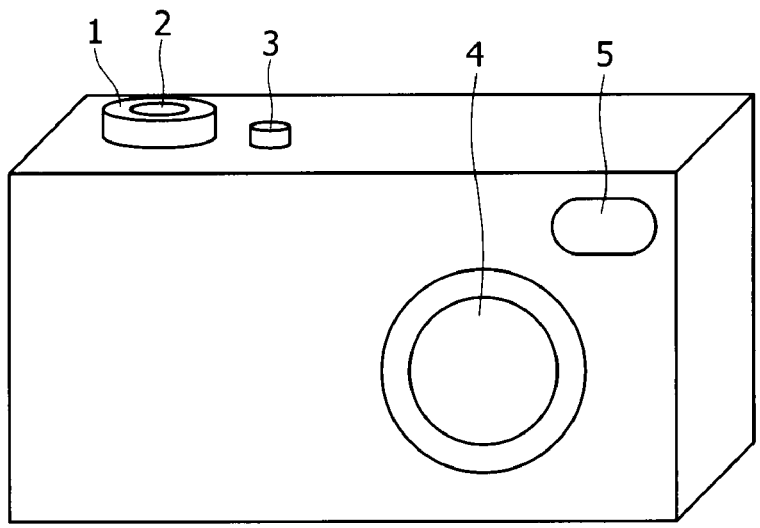
FIG. 1 is a perspective-view diagram showing a typical configuration of the front-side surface of an image pickup apparatus.
Figure 2:
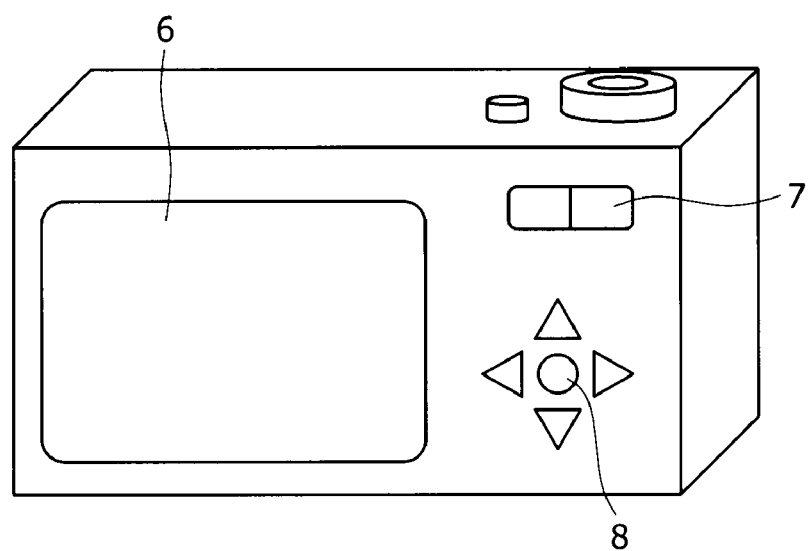
FIG. 2 is a perspective-view diagram showing a typical configuration of the rear-side surface of the image pickup apparatus.

Next, a preferred concrete embodiment of the present invention is explained by referring to diagrams as follows. The embodiment implements an image pickup apparatus 10 provided by the present invention to serve as an apparatus capable of increasing the response speed by raising the frequency to update the inferred velocity of a dynamic body serving as a subject of an image pickup operation carried out by the image pickup apparatus 10. As shown in diagrams of FIGS. 1 and 2 for example, the image pickup apparatus 10 used as a camera employs a mode dial 1, a release button 2, a power-supply switch 3, a lens 4, a flash lamp 5, a liquid-crystal panel 6, a zoom key 7 and an operation section 8.

The mode dial 1 is a component for setting one of modes provided for an image pickup operation or a mode for reproducing an image picked up in the image pickup operation. The release button 2 is a trigger component for allowing an auto focus operation to be carried out or enabling an image pickup function. To put it in detail, when the release button 2 is pressed shallowly to a first press position, the auto focus operation can be carried out. When the release button 2 is pressed deeply to a second press position, on the other hand, the image taking function is enabled. The power-supply switch 3 is a component to be operated to turn the power supply of the main body of the image pickup apparatus 10 serving as a camera on or off. Used for receiving incoming light, the lens 4 typically has a focus lens and a zoom lens. The flash lamp 5 is typically provided with a xenon discharge tube, a light automatic adjustment device or the like. On the basis of a control signal received from a control section 19 to be described later in detail, a flash-lamp tube is driven to emit light which is then radiated to a subject of an image pickup operation. The liquid-crystal panel 6 is a component utilized by the user to verify an image to be picked up by carrying out an image pickup operation. The zoom key 7 is a component to be operated by the user to drive a zoom motor in order to set a wide-angle or a telescopic photographing field angle. The operation section 8 is a component functioning as an interface for passing on an intention of the user to the image pickup apparatus 10.

Figure 3:
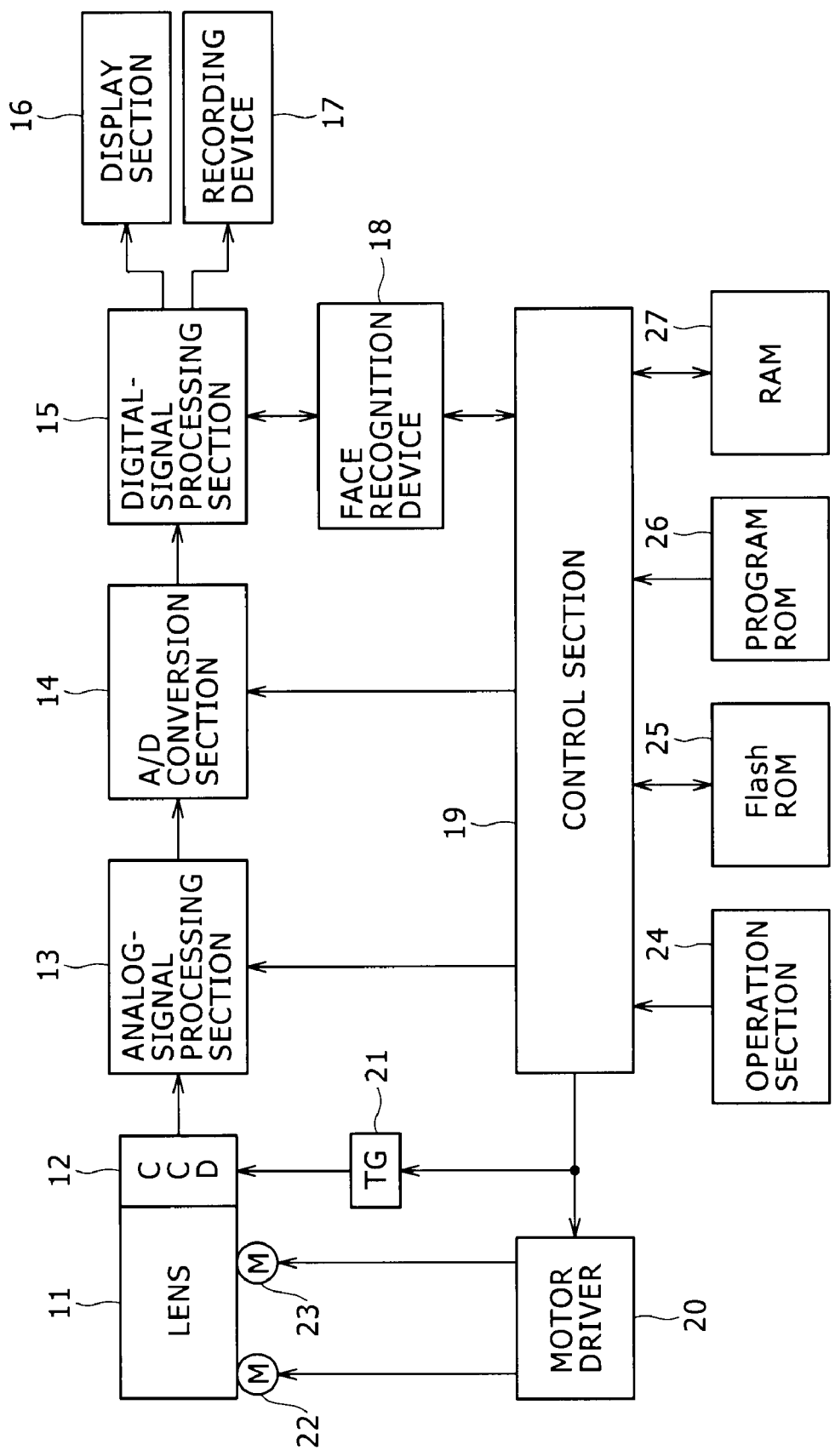
FIG. 3 is a block diagram showing a typical internal configuration of the image pickup apparatus.

Next, a typical internal configuration of the image pickup apparatus 10 is explained. As shown in a diagram of FIG. 3 for example, the image pickup apparatus 10 employs a lens 11, an image pickup device 12, an analog-signal processing section 13, an A/D conversion section 14, a digital-signal processing section 15, a display section 16, a recording device 17, a face recognition section 18, a control section 19, a motor driver 20, a timing generator 21, a focus-lens driving motor 22, a zoom-lens driving motor 23, an operation section 24, a flash ROM (Read Only Memory) 25, a program ROM 26 and a RAM 27.

A light beam hitting the lens 11 is passed on to the image pickup device 12 which is typically a CCD (Charge Coupled Device). The image pickup device 12 carries out an opto-electrical process of converting the light beam into an electrical signal and supplies data of the electrical signal to the analog-signal processing section 13.

The analog-signal processing section 13 carries out processing such as a process of removing noises from the data received from the image pickup device 12 as data which is obtained as a result of the opto-electrical process carried out by the image pickup device 12. The analog-signal processing section 13 supplies data obtained as a result of the processing to the A/D conversion section 14.

The A/D conversion section 14 receives the analog data from the analog-signal processing section 13 which is obtained as a result of the processing such as a process carried out by the analog-signal processing section 13 to remove noises from the data received from the image pickup device 12. Then, the A/D conversion section 14 carries out an analog-to-digital process of converting the analog data received from the analog-signal processing section 13 into digital data and supplies the digital data to the digital-signal processing section 15.

The digital-signal processing section 15 carries out signal processing on the digital data received from the A/D conversion section 14 as data which is obtained from the analog-to-digital process carried out by the A/D conversion section 14, and supplies a result of the signal processing to the display section 16, the recording device 17 as well as the face recognition section 18. The signal processing carried out by the digital-signal processing section 15 includes various kinds of signal formation and a variety of correction processes.

The display section 16 is typically the liquid-crystal panel 6 described earlier. The display section 16 displays the data received from the digital-signal processing section 15. In addition, the display section 16 also displays an image passing through the lens 11 without regard to whether or not an image pickup operation is being carried out.

The recording device 17 is typically a flash memory used for storing the data received from the digital-signal processing section 15.

The face recognition section 18 analyzes the data received from the digital-signal processing section 15 typically in order to detect the face of a person included in the image represented by the data. The face recognition section 18 then supplies information on the detected face to the control section 19.

The control section 19 is configured to typically include a CPU which serves as a member for controlling operations carried out by the other sections employed in the image pickup apparatus 10. The control section 19 typically executes a program, which has been stored in the flash ROM 25 in advance, in order to carry out an AF process for keeping track of a dynamic body serving as a subject of the image pickup operation as will be described later in detail. In addition, the control section 19 also detects the states, in which the size and position of a person change, on the basis of the face information received from the face recognition section 18 as information on the face of the person serving as the subject of an image pickup operation.

The motor driver 20 is a section for driving the focus-lens driving motor 22 and the zoom-lens driving motor 23. The focus-lens driving motor 22 is a motor for moving a focus lens of the lens 11 whereas the zoom-lens driving motor 23 is a motor for moving a zoom lens of the lens 11.

In accordance with a control signal received from the control section 19, the TG (Time Generator) 21 generates a control signal for controlling the timing of processing carried out by the image pickup device 12. That is to say, the control signal generated by the control section 19 eventually controls the timing of processing carried out by the image pickup device 12.

The operation section 24 is a section which typically includes the mode dial 1 for setting one of modes provided for an image pickup operation, the release button 2, a zoom button and an operation button. As described earlier, the mode dial 1 and the release button 2 are provided on a camera main body 9 of the image pickup apparatus 10 whereas the zoom button and the operation button are shown in none of figures. The operation button is a button used for inputting various kinds of operation information.

The flash ROM 25 is a memory used for storing, among other information, image data, various kinds of supplementary information and a variety of programs. The program ROM 26 is a memory used for storing, among other information, programs to be executed by the control section 19 and processing parameters to be used by the control section 19. The RAM 27 is a memory used for storing, among other information, a specific program being executed by the control section 19 and parameters varying from time to time in the course of the execution of the specific program.

Figure 4:
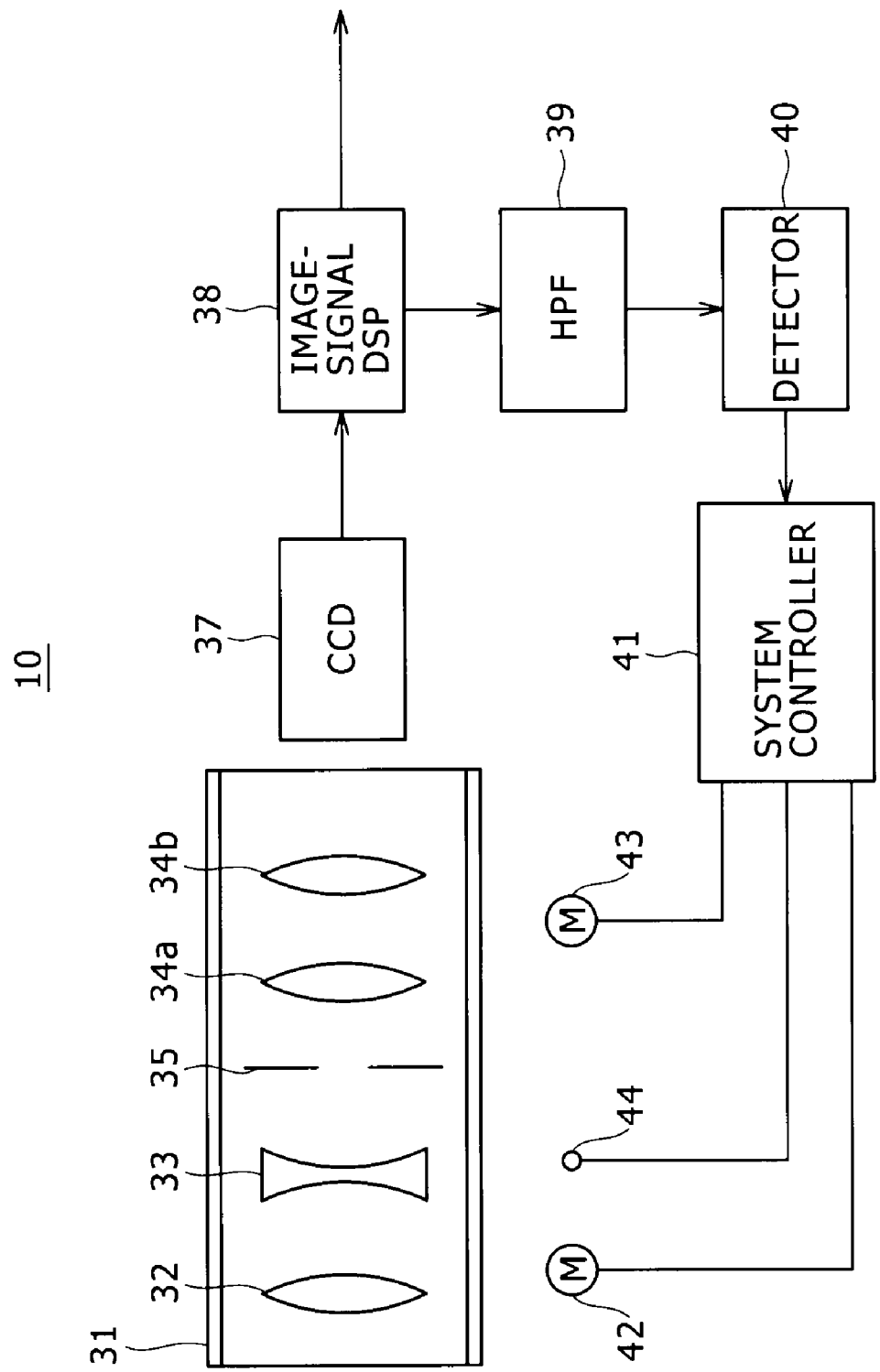
FIG. 4 is a block diagram showing another typical internal configuration of the image pickup apparatus.

Next, a typical concrete internal configuration of the image pickup apparatus 10 is explained. As shown in a diagram of FIG. 4, the image pickup apparatus 10 typically has a lens mirror cylinder 31, a CCD 37, an image-signal processing DSP (Digital Signal Processor) 38, an HPF (High Pass Filter) 39, a detector 40, a system controller 41, a zoom motor 42, a focus motor 43 and a reset sensor 44. It is to be noted that the CCD 37 corresponds to the CCD 12 shown in the diagram of FIG. 3. The HPF 39, the detector 40 and the system controller 41 are typically included in the control section 19 shown in the diagram of FIG. 3.

The lens mirror cylinder 31 includes a variable magnification system 32, a variable magnification system 33, a focus system 34a and a focus system 34b, and a diaphragm/shutter 35 which are arranged in an order starting from the front side of the lens mirror cylinder 31. A light beam arriving from an external source passes through the lens mirror cylinder 31. In the following description, the focus system 34a and the focus system 34b are also collectively referred to as a focus lens 34.

The CCD 37 carries out an opto-electrical process of converting an arriving light beam from the lens mirror cylinder 31 into an electrical signal and supplies the electrical signal to the image-signal processing DSP 38.

The image-signal processing DSP 38 typically fetches a luminance signal from the electrical signal received from the CCD 37 and supplies the fetched luminance signal to the HPF 39.

The HPF 39 typically detects high-frequency components from the luminance signal received from the image-signal processing DSP 38 and supplies the detected high-frequency components to the detector 40.

The detector 40 typically computes an evaluation value, which is to be used in an AF process, on the basis of the high-frequency components received from the HPF 39. The detector 40 then supplies the evaluation value to the system controller 41. It is to be noted that the detector 40 may also be provided with an integration circuit for integrating the high-frequency components detected by a band pass filter and/or the HPF 39 for each screen unit in order to compute an evaluation value for the screen unit.

The system controller 41 typically moves the focus lens 34 by driving the zoom motor 42 and the focus motor 43 to an in-focus position which has been found on the basis of evaluation values received from the detector 40. That is to say, the system controller 41 carries out the AF process cited above. In addition, the system controller 41 detects reference positions for the variable magnification system 32, the variable magnification system 33 and the focus lens 34 in accordance with signals output by the reset sensor 44.

On top of that, the system controller 41 carries out processing in accordance with a procedure which consists of processes (i) to (iv) described as follows:
(i): Determine a range in which a scan operation is to be carried out.
(ii): Carry out the scan operation (That is to say, move the focus lens 34 and acquire an evaluation value at each of positions determined in advance).
(iii): Hold the focus lens at the end position of the scan operation and sustain a wait state till the evaluation values are acquired.
(iv): Detect a position at which the contrast is maximized on the basis of the evaluation values and take the detected position as an in-focus position.

In AF processing carried out by the image pickup apparatus 10 to keep track of a dynamic body serving as a subject of the image pickup operation, while processes (i) to (iv) described above are being performed repeatedly, the velocity of a movement made by the subject of the image pickup operation is inferred on the basis of a change of the in-focus position detected in each AF processing. As will be described later in detail, process (ii) is carried out in a first period whereas processes (iii) and (iv) are carried out in a second period. The image pickup apparatus 10 saves evaluation values acquired in the course of process (iii) and computes a second image-pickup-operation subject inferred velocity $V_{new}$ to be described later in detail as a velocity to be used in a process of estimating the velocity of the subject of the image pickup operation.

Next, typical AF processing carried out to keep track of a dynamic body is explained by referring to a flowchart shown in FIG. 5 as follows. For example, the AF processing is started when the mode dial 1 is operated to set the image pickup apparatus 10 in an AF mode provided for keeping track of a dynamic body serving as a subject of the image pickup operation.

At the first step S1 of the flowchart, the system controller 41 carries out a scan AF process. The scan AF process will be described later in detail.

Then, at the next step S2, the system controller 41 estimates an image-pickup-operation subject velocity V. To put it more concretely, the system controller 41 estimates an image-pickup-operation subject velocity V by making use of data obtained in the scan AF process carried out at the step S1. To be more specific, the system controller 41 estimates an image-pickup-operation subject velocity V by making use of changes of the in-focus position which is found by making use of data obtained in the scan AF process carried out at the step S1. That is to say, the in-focus position changes during an interval between a specific AF scan process and another AF scan process following the specific AF scan process. In other words, the interval is a period between the start of a driving operation to move the focus lens 34 in order to find an in-focus position and the start of a next driving operation to move the focus lens 34 in order to find the next in-focus position.

Then, at the next step S3, the system controller 41 determines whether or not the release button 2 has been deeply pressed. If the release button 2 has been deeply pressed, the flow of the AF processing to keep track of the dynamic body goes on to a process of a step S4. If the release button 2 has not been deeply pressed, on the other hand, the flow of the AF processing to keep track of the dynamic body goes back to the step S1 to repeat the scan AF process.

At the step S4, the system controller 41 moves the focus lens 34 to the in-focus position and ends the AF processing to keep track of the dynamic body.

Figure 5:
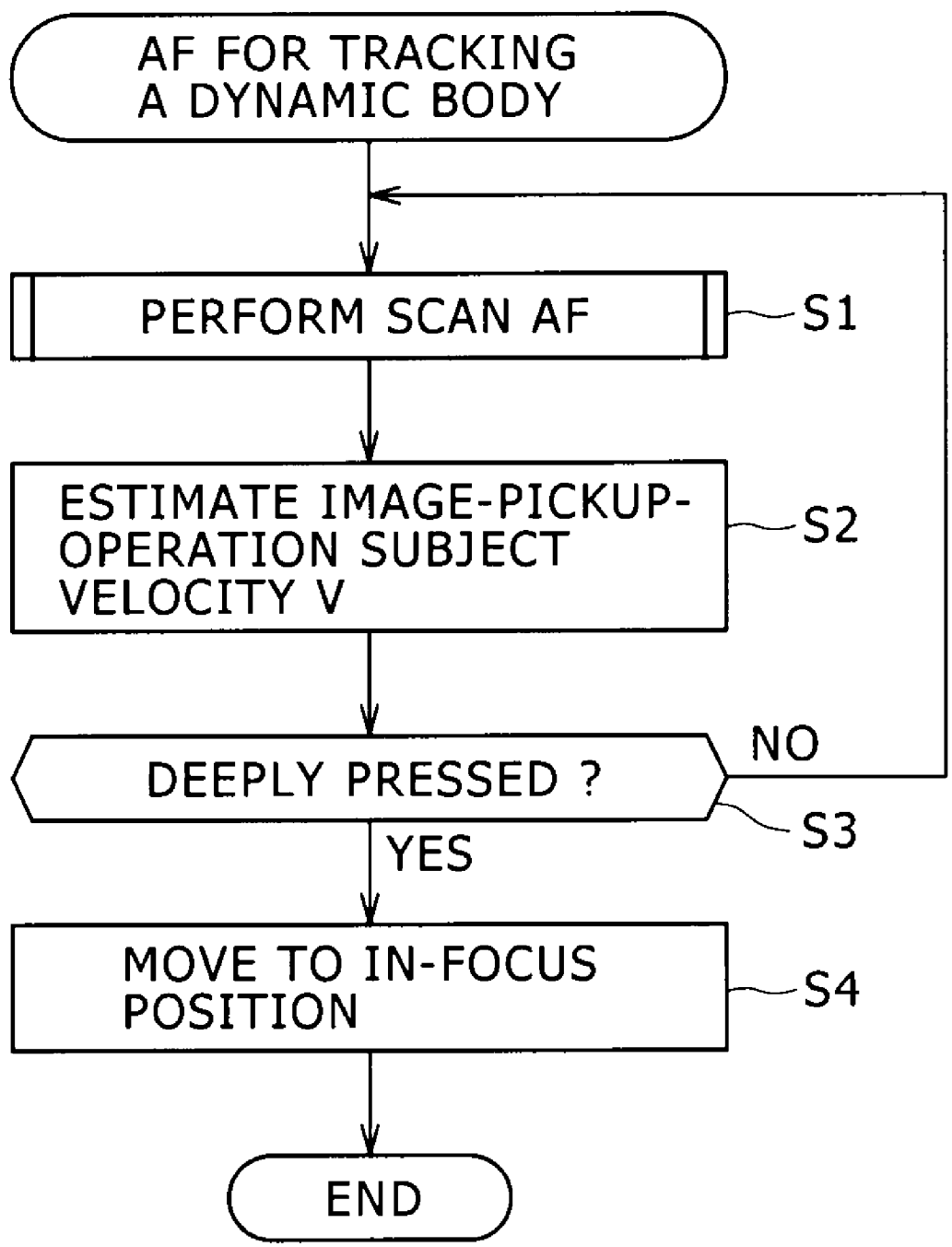
FIG. 5 shows a flowchart to be referred to in description of typical operation tracking AF (Auto Focus) processing.
Figure 6:
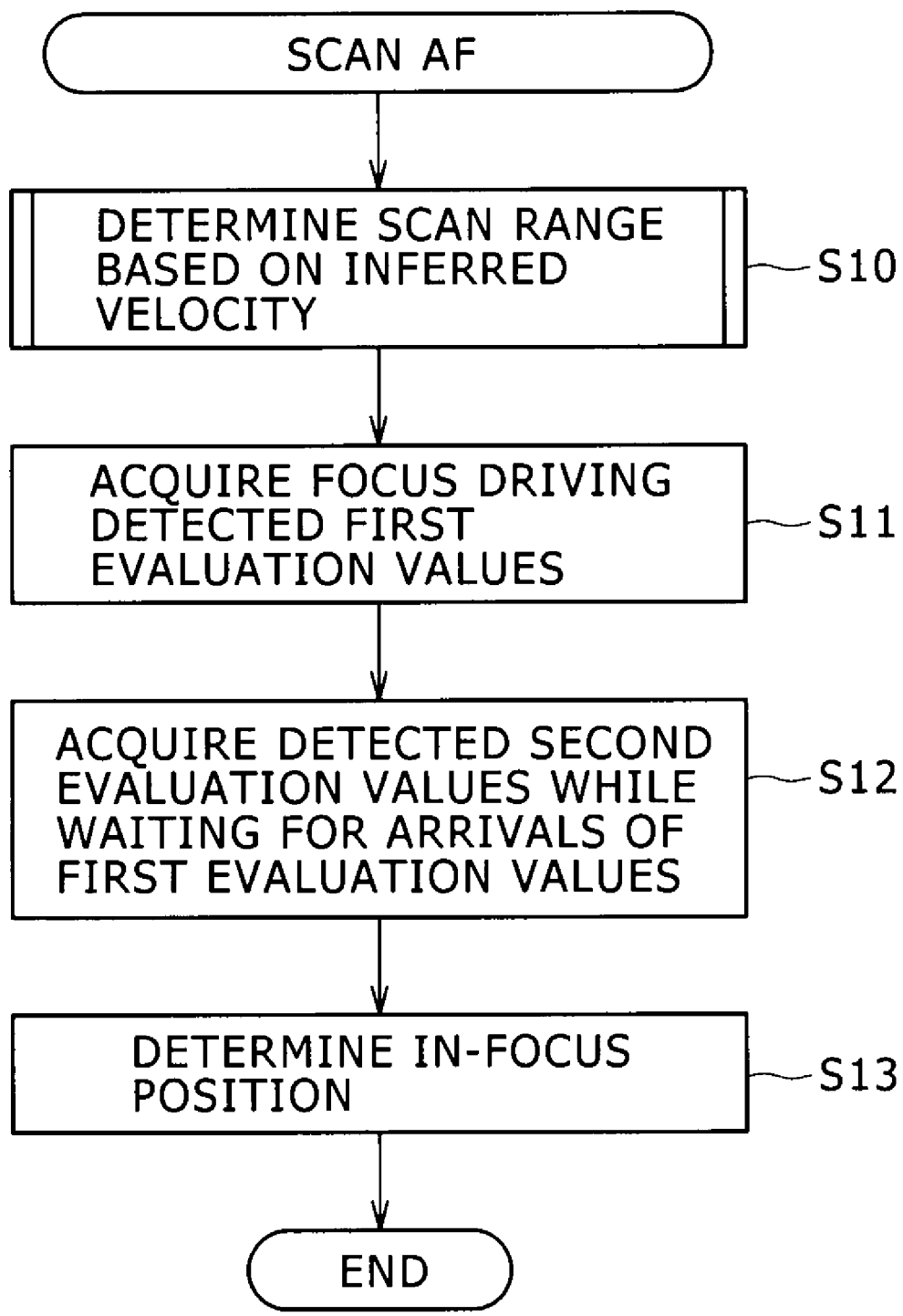
FIG. 6 shows a flowchart to be referred to in description of scan AF processing carried out at a step S1 of the flowchart shown in FIG. 5.

Next, details of a typical scan AF process carried out at the step S1 of the flowchart shown in FIG. 5 are explained by referring to a flowchart shown in FIG. 6.

At the first step S10, the system controller 41 determines a scan range on the basis of an inferred velocity of the dynamic body which serves as a subject of the image pickup operation. When the system controller 41 determines a scan range for the first time for example, the image-pickup-operation subject velocity V has not been estimated yet. In this case, a default scan range determined in advance is taken as the first scan range. Thereafter, the system controller 41 determines a scan range on the basis of the image-pickup-operation subject velocity V which is computed by making use of a change of the in-focus position.

Then, at the next step S11, the system controller 41 drives the focus lens 34 to move from a position determined in advance to another predetermined position and acquires an evaluation value for each of the positions. As shown in a diagram of FIG. 7 for example, the system controller 41 drives the focus lens 34 to move sequentially over a scan range including positions (a) to (e) determined in advance, and stops the focus lens 34 at position (e). The process is carried out in the so-called first period. During the first period, the detector 40 obtains the evaluation value computed for each of the positions and supplies the evaluation value to the system controller 41. Each of the evaluation values computed during the first period is referred to as a first evaluation value.

Figure 7:
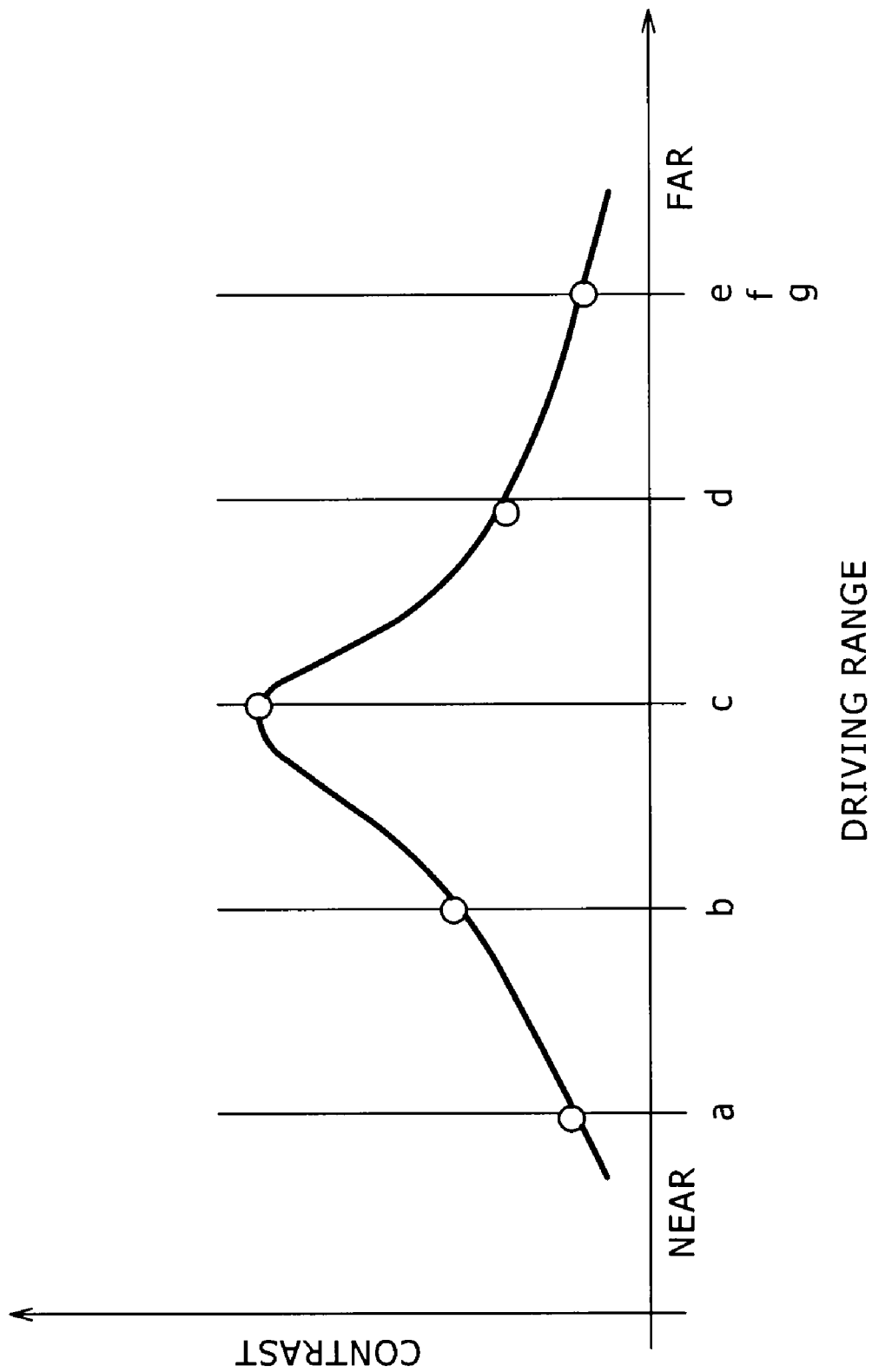
FIG. 7 is a diagram showing a curve representing a relation between the position of a focus lens and an evaluation value obtained at the position.

Then, at the next step S12, while waiting for the first evaluation values described above, the system controller 41 acquires evaluation values each referred to as a second evaluation value. That is to say, during a second period between the end of the first period and a process to compute an in-focus position on the basis of the first evaluation values, the system controller 41 acquires the second evaluation values. The second evaluation values are obtained at at least one of positions (a) to (e) determined in advance. In the case of the typical example shown in the diagram of FIG. 7, the second evaluation values are obtained for positions (f) and (g) which are coincident with position (e). To put it more concretely, the system controller 41 drives the focus lens 34 to move over the scan range including positions (a) to (e) determined in advance and, then, stops the focus lens 34 at position (e) as shown in the diagram of FIG. 7. The system controller 41 is holding the focus lens 34 at position (e) till all the first evaluation values have arrived from the detector 40. That is to say, the system controller 41 is holding the focus lens 34 at position (e) and waiting for all the first evaluation values to arrive from the detector 40. While waiting for all the values, the system controller 41 stores the second evaluation values obtained for the positions denoted by reference notations (f) and (g) in the RAM 27 so that the second evaluation values can be used in a process to be carried out at the step S2 to estimate the image-pickup-operation subject velocity V.

Figure 8:
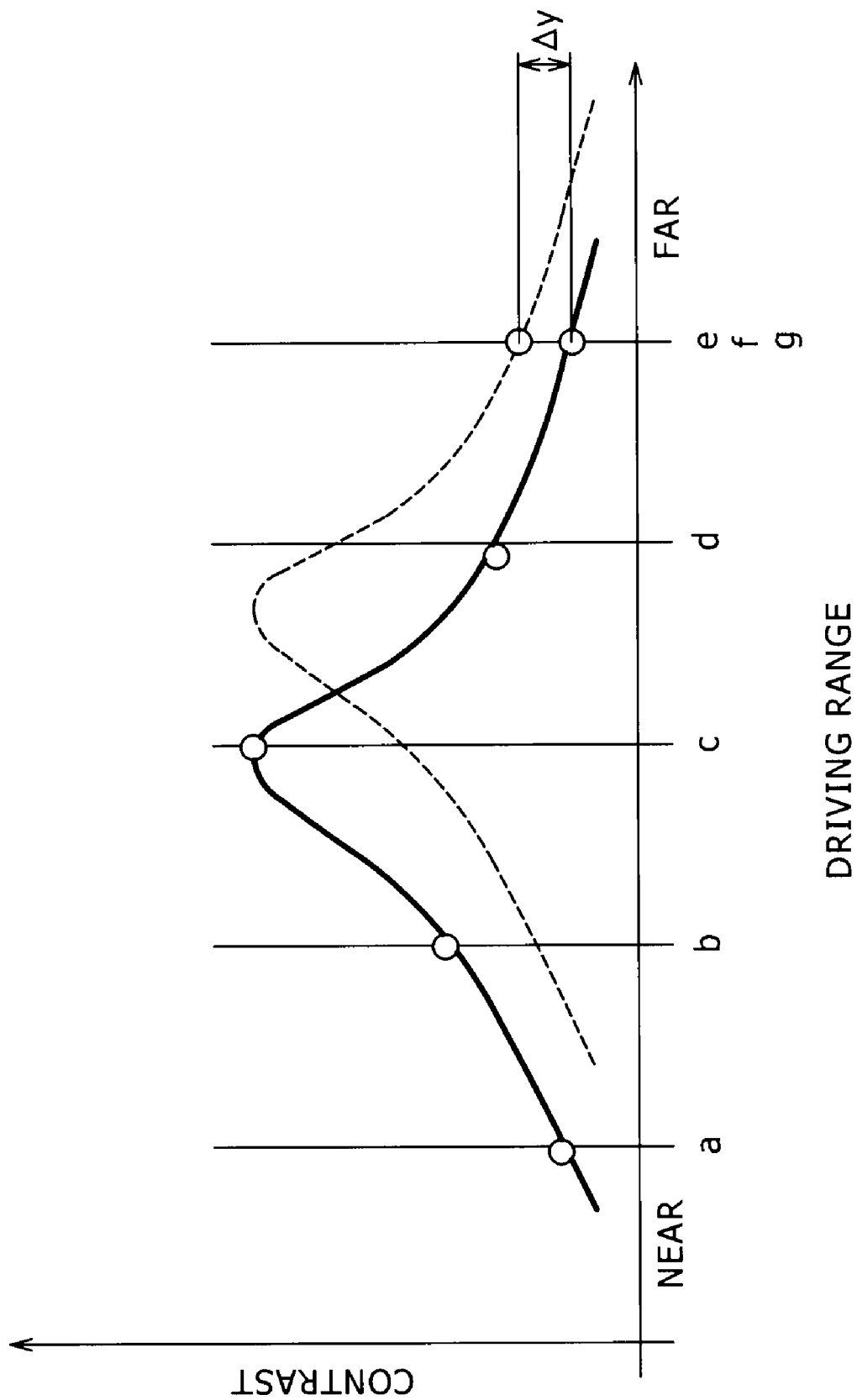
FIG. 8 is a diagram showing curves each representing a relation between the position of a focus lens and the evaluation value obtained at the position.

If the subject of the image pickup operation is moving from time to time, the peak of a mountain-like curve representing a relation between the evaluation value indicating the strength of the contrast and the position of the focus lens 34 is shifted to the near side or the far side as indicated in a diagram of FIG. 8. Since the peak of the mountain-like curve representing the strength of the contrast is shifted, the evaluation value obtained at the same position denoted by reference notations (e) to (g) also changes by an evaluation-value difference $\Delta y$ which can be a contrast-strength increase or a contrast-strength decrease, depending on whether the peak is shifted in a direction toward the near or far side. To put it more concretely, for example, the difference between the first evaluation value obtained for position (e) and the second evaluation value obtained for position (f) or (g) is the evaluation-value difference $\Delta y$.

Figure 9:
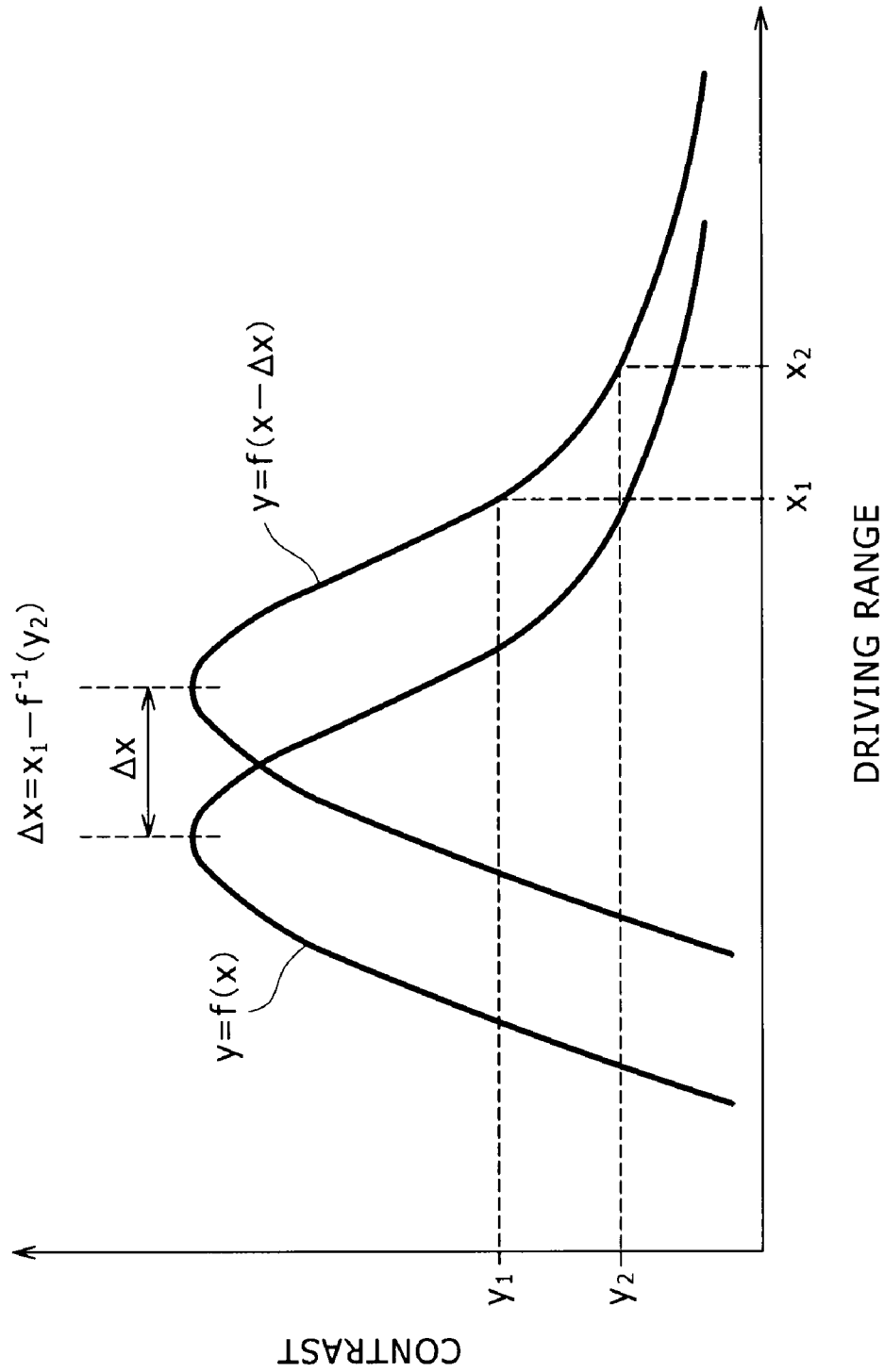
FIG. 9 is a diagram to be referred to in description of a shift of a peak of evaluation values.

Then, at the next step S13, the system controller 41 determines the in-focus position of the focus lens 34. That is to say, the system controller 41 determines the in-focus position of the focus lens 34 by detecting as a position at which the contrast strength represented by the evaluation values obtained in the process carried out at the step S12 becomes a maximum. The system controller 41 measures the evaluation-value change ($\Delta y$) at position (e) at which the focus lens 34 is stopped on the basis of a second evaluation value and a first evaluation value for the position of the second evaluation value as shown in FIG. 8. Here, the mountain-like curve is expressed by a function $y=f(x)$ as shown in a diagram of FIG. 9. In the function, the independent variable x represents the position of the focus lens 34 whereas the dependent variable y represents the evaluation value. In this case, the shift $\Delta x$ of the peak of the mountain-like curve is expressed by Eq. (6) given as follows:

$$\Delta x = x_1 - f^{-1}(y_2) \quad (6)$$

Figure 10:
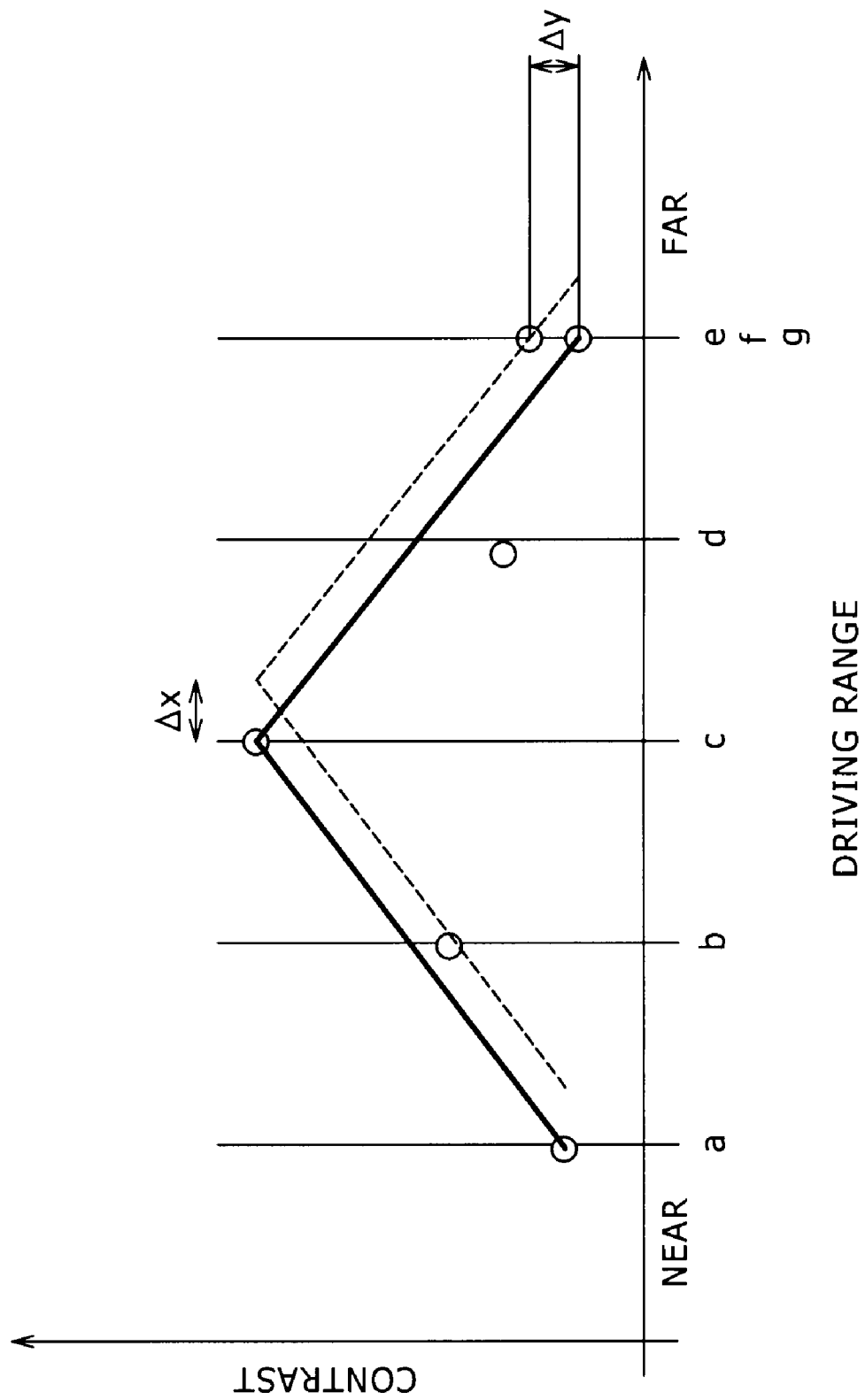
FIG. 10 is a diagram to be referred to in description of a linear equation used for approximating the relation between the position of a focus lens and the evaluation value obtained at the position.

In addition, it is also possible to provide a desirable configuration in which the system controller 41 approximates the data distribution curve of the first evaluation value, that is, the function $y=f(x)$ by a linear expression drawn with a solid line as shown in FIG. 10. On the basis of the liner expression and the evaluation-value change $\Delta y$ which is determined based on the first and second evaluation values, it is desirable to infer a direction in which the subject of the image pickup operation is moving. In this case, the precision of the process to infer the image-pickup-operation subject velocity V is no longer high. Nevertheless, the direction in which the subject of the image pickup operation is moving can be determined from only the sign of the evaluation-value change $\Delta y$.

As described above, a second evaluation value obtained while the system controller 41 is waiting for a first evaluation value is used in a process of inferring an estimated distance between two consecutive in-focus positions to serve as a distance to be used in a process of estimating the image-pickup-operation subject velocity V. Thus, since the precision of a process carried out by the image pickup apparatus 10 to infer an estimated distance between two consecutive in-focus positions can be improved, it is also possible to improve the precision of a process of estimating the image-pickup-operation subject velocity V of a movement made by a dynamic body serving as the subject of the image pickup apparatus in the AF processing to keep track of the dynamic body.

Figure 11:
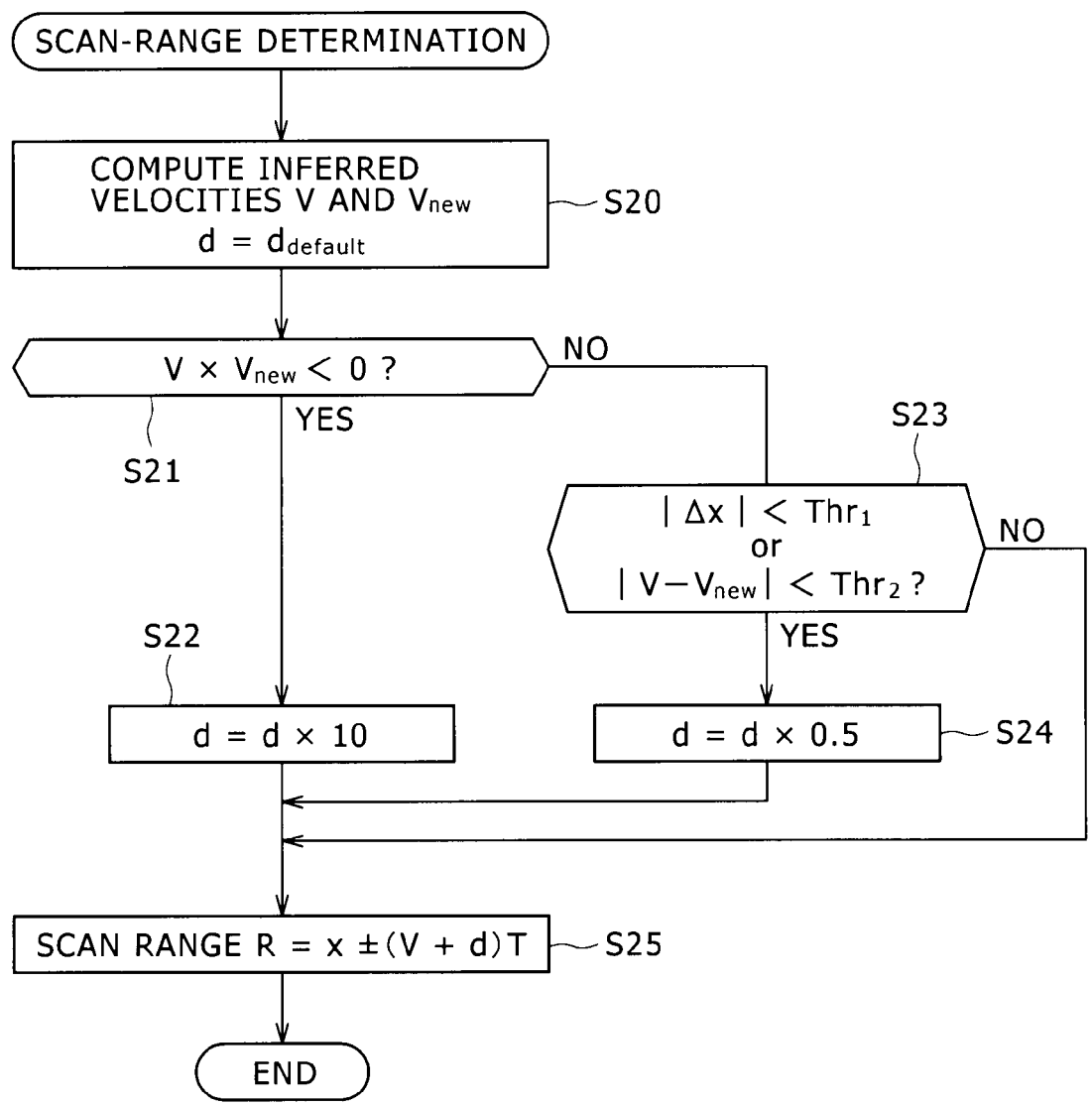
FIG. 11 shows a flowchart to be referred to in description of scan-range determination processing carried out at a step S10 of the flowchart shown in FIG. 6.

By referring to a flowchart shown in FIG. 11, the following description explains details of a typical process carried out at the step S10 of the flowchart shown in FIG. 6 to determine a scan range.

At the first step S20, the system controller 41 computes the image pickup operation subject velocities V and $V_{new}$ in accordance with the following equation:

$$V_{new} = (\Delta x)/T \quad (7)$$

In Eq. (7) described above, reference notation T denotes the second period of the step S12 of the flowchart shown in FIG. 6 whereas reference notation $V_{new}$ denotes a velocity computed on the basis of a movement made by the subject of the image pickup operation during the second period as a velocity of the subject of the image pickup operation.

Then, at the next step S21, the system controller 41 determines whether or not a relation $V \times V_{new} < 0$ is satisfied. If the relation $V \times V_{new} < 0$ is satisfied, the system controller 41 determines that it is quite within the bounds of possibility that there has been a failure in a process of inferring the velocity of the subject of the image pickup operation. In this case, the flow of the scan-range determination processing goes on to a step S22. If the relation $V \times V_{new} < 0$ is not satisfied, on the other hand, the flow of the scan-range determination processing goes on to a step S23.

Figure 12:
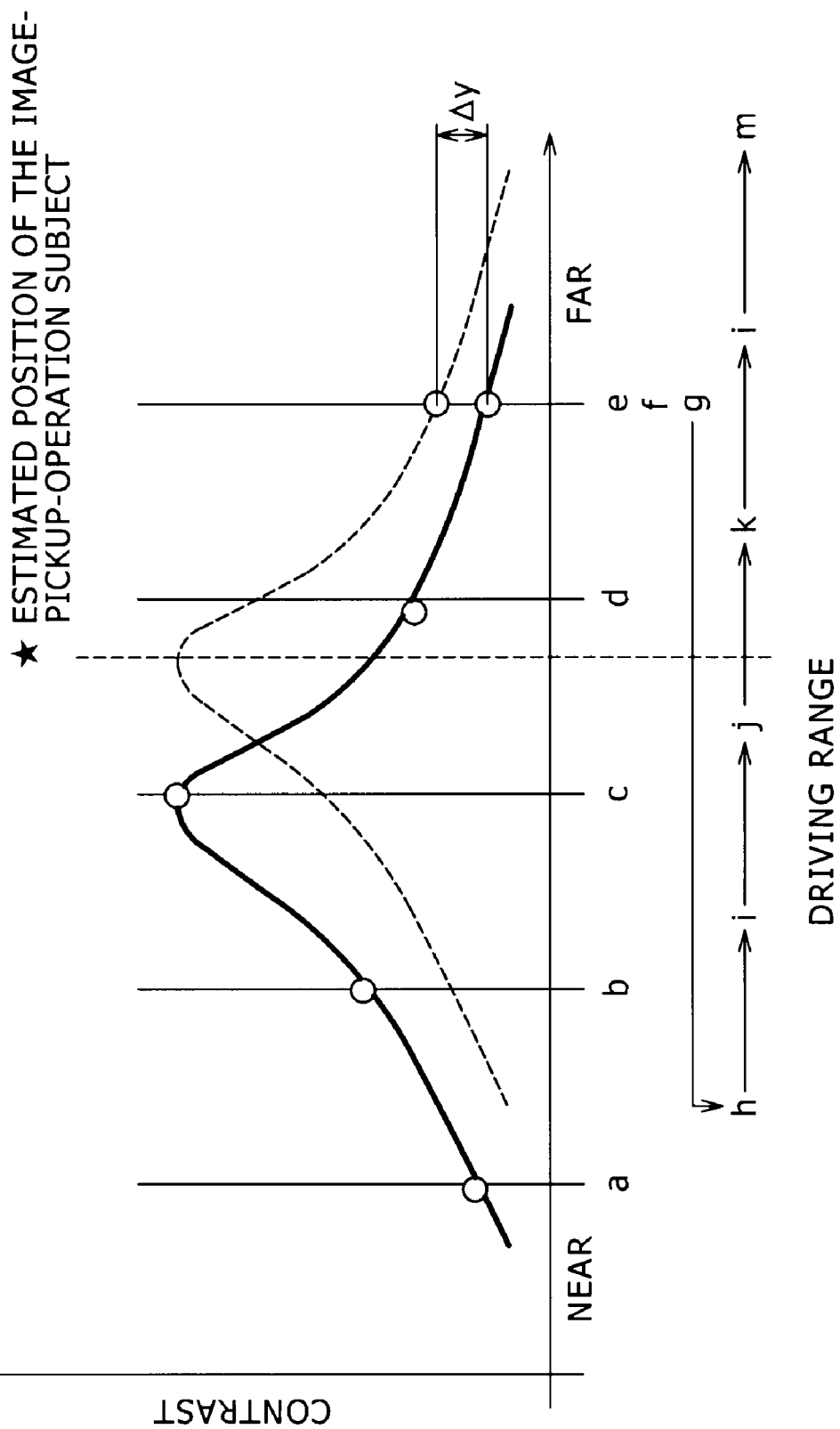
FIG. 12 is a diagram showing a scan range extended from the scan range of a relation between the position of a focus lens and the evaluation value obtained at the position.

At the step S22, the system controller 41 multiplies the default value of a parameter d by a coefficient of 10. The parameter d is a parameter determined in accordance with the possibility of the existence of an error in the velocity of the subject of the image pickup operation. That is to say, the system controller 41 determines that the reliability of the velocity of the subject of the image pickup operation is low so that it is necessary to increase the scan range by raising the parameter d. If the system controller 41 determines that the reliability of the computed velocity of the subject of the image pickup operation is low, the system controller 41 increases the number of sampling operations by widening the scan range as shown in a diagram of FIG. 12. That is to say, a range from position (h) to position (m) shown in the diagram of FIG. 12 is taken as a scan range for detecting the next in-focus position.

At the next step S23, the system controller 41 determines whether or not a relation |Δx|<Thr1 is satisfied. In the relation, reference notation Thr1 denotes a first threshold value serving as the upper limit of the absolute value of Δx whereas reference notation Δx denotes a change of a movement made by the subject of the image pickup operation. To put it more concretely, the first threshold value Thr1 is set at the upper limit of a range in which the subject of the image pickup operation can be assumed to be at a standstill. If the relation |Δx|<Thr1 is satisfied, the scan range is reduced in order to give a high priority to the response speed of the image pickup apparatus 10 even if the image-pickup-operation subject velocity V has a large value. In other words, if the change Δx of a movement made by the subject of the image pickup operation is not greater than the first threshold value Thr1 determined in advance, the scan range for the subject of the image pickup operation is made smaller than the present value. If the system controller 41 determines that the relation |Δx|<Thr1 is satisfied, the flow of the scan-range determination processing goes on to a step S24. If the system controller 41 determines that the relation |Δx|<Thr1 is not satisfied, on the other hand, the flow of the scan-range determination processing goes on to a step S25.

In addition, at the step S23, the system controller 41 also determines whether or not a relation |V−V$_{new}$|<Thr2 is satisfied. Reference notation Thr2 in the relation denotes a second threshold value serving as the upper limit of a range for the absolute value of the velocity difference (V−V$_{new}$). To put it more concretely, the second threshold value Thr2 is set in advance at the upper limit of a range for which the system controller 41 considers that the inferred velocity of the subject of the image pickup operation is correct and, if the image-pickup-operation subject velocities V and Vnew show the same trend, the range of the next scan AF process is reduced in order to give a high priority to the response velocity of the image pickup apparatus 10. That is to say, the system controller 41 reduces the range of the next scan AF process also when the system controller 41 also determines that the relation |V−V$_{new}$|<Thr2 is satisfied. If the system controller 41 determines that the relation |V−V$_{new}$|<Thr2 is satisfied, the flow of the scan-range determination processing goes on to the step S24. If the system controller 41 determines that the relation |V−V$_{new}$|<Thr2 is not satisfied, on the other hand, the flow of the scan-range determination processing goes on to the step S25.

Figure 13:
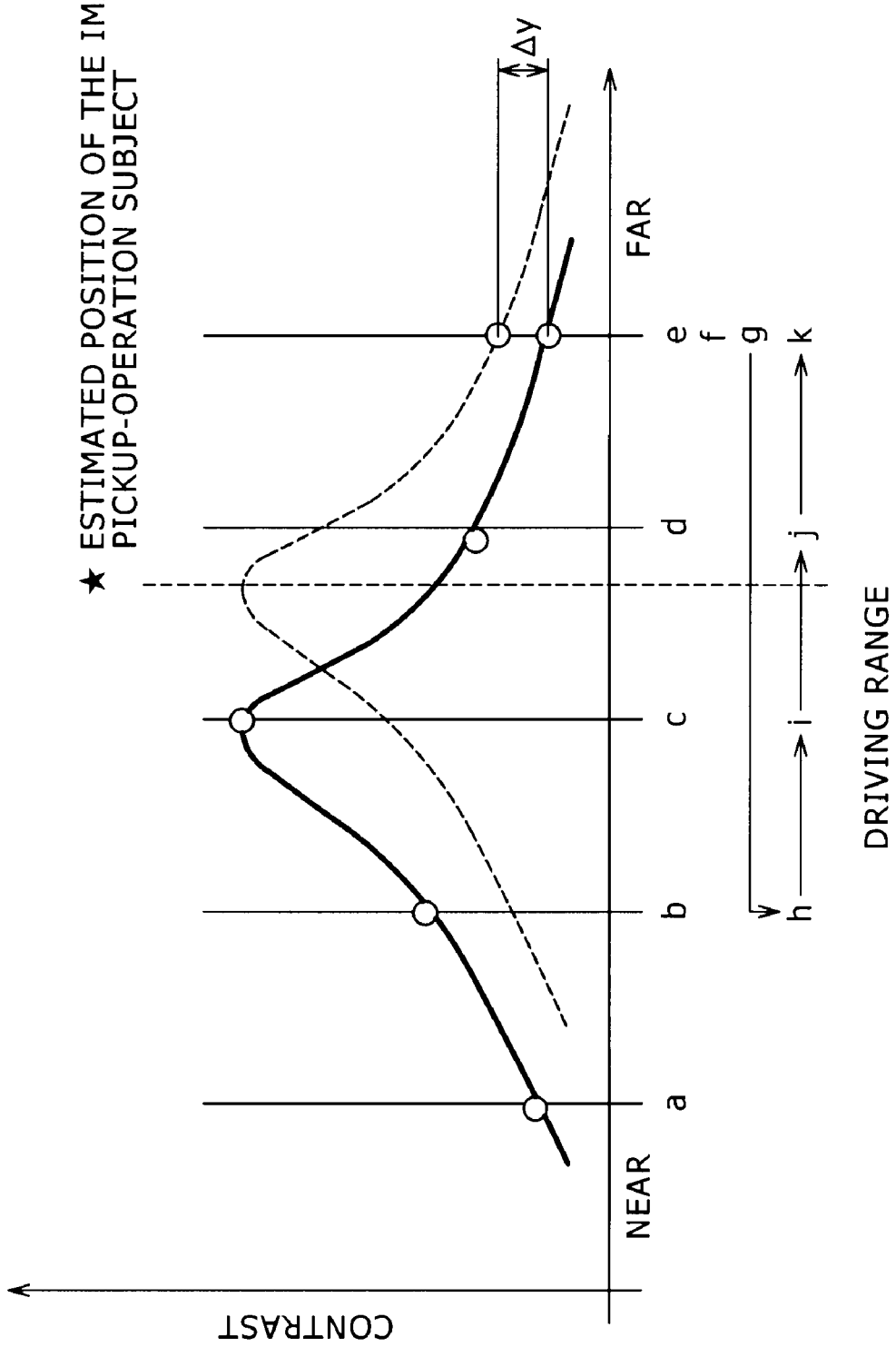
FIG. 13 is a diagram showing another scan range extended from the scan range of a relation between the position of a focus lens and the evaluation value obtained at the position.

At the step S24, the system controller 41 multiplies the parameter d by a coefficient of 0.5. That is to say, the system controller 41 determines that the reliability of the computed velocity of the subject of the image pickup operation is high and reduces the scan range to a smaller range including the in-focus position before carrying out the scan AF process. As shown in a diagram of FIG. 13 for example, when the system controller 41 determines that the reliability of the computed velocity V of the subject of the image pickup operation is high, the scan range of the next scan AF process to detect the in-focus position is reduced in order to decrease the number of sampling operations. To put it more concretely, a range starting from position (h) and ending at position (k) as shown in the diagram of FIG. 13 is taken as the scan range of the next scan AF process to detect the in-focus position.

At the step S25, on the basis of the computed velocity V of the subject of the image pickup operation, the system controller 41 finds the scan range R in accordance with the equation R=x±(V+d)T. In this way, the system controller 41 determines the scan range of the next scan AF process by making use of the parameter d and the estimated position x of the subject of the image pickup operation. Thus, the system controller 41 is capable of lowering the probability that the track of the subject of the image pickup operation is lost. That is to say, when the system controller 41 determines that the reliability of the computed velocity V of the subject of the image pickup operation is high, the scan range of the next scan AF process to detect the in-focus position is reduced in order to increase the response speed of the image pickup apparatus 10. When the system controller 41 determines that the reliability of the computed velocity V of the subject of the image pickup operation is low, on the other hand, the scan range of the next scan AF process to detect the in-focus position is increased in order to lower the probability that the track of the subject of the image pickup operation is lost.

As described above, in accordance with the image pickup apparatus 10, by shortening the period of an operation to sample distance information (that is, the distance between 2 successive in-focus positions), the frequency of an operation to update the inferred velocity of the subject of the image pickup operation can be raised. Thus, the scan range can be reduced and the response speed of the image pickup apparatus 10 can therefore be increased. That is to say, the time period of waiting for arrivals of evaluation values tends to vary due to the performance of the hardware of the image pickup apparatus 10. In the case of the image pickup apparatus 10, however, the waiting time between the exposure and the operation to acquire evaluation values can be eliminated. Thus, in the case of the image pickup apparatus 10, the interval T between any specific scan AF process and a scan AF process immediately following the specific scan AF process can be essentially shortened. In the case of the typical examples shown in the diagrams of FIGS. 12 and 13, the interval T is a period corresponding to a range between positions (a) and (h).

In addition, in accordance with the image pickup apparatus 10, the number of operations to sample distance information per unit time is increased. Thus, the precision of the process to infer the distance of a movement made by the subject of the image pickup operation can be improved. As a result, the precision of the process to estimate the velocity of a dynamic body being followed in an AF processing as the subject of the image pickup operation can also be improved as well.

In the embodiment described above, the focus lens 34 is stopped at the search end position. It is to be noted, however, that the focus lens 34 can also be stopped at a position other than the search end position. In addition, the distance of a movement made by the subject of the image pickup operation can be measured while the focus lens 34 is being driven to move. On top of that, the distance of a movement made by the subject of the image pickup operation can be used in a process to infer the velocity of the subject of the image pickup operation while taking the distance of the movement of the focus lens 34 into consideration.

Figure 14:
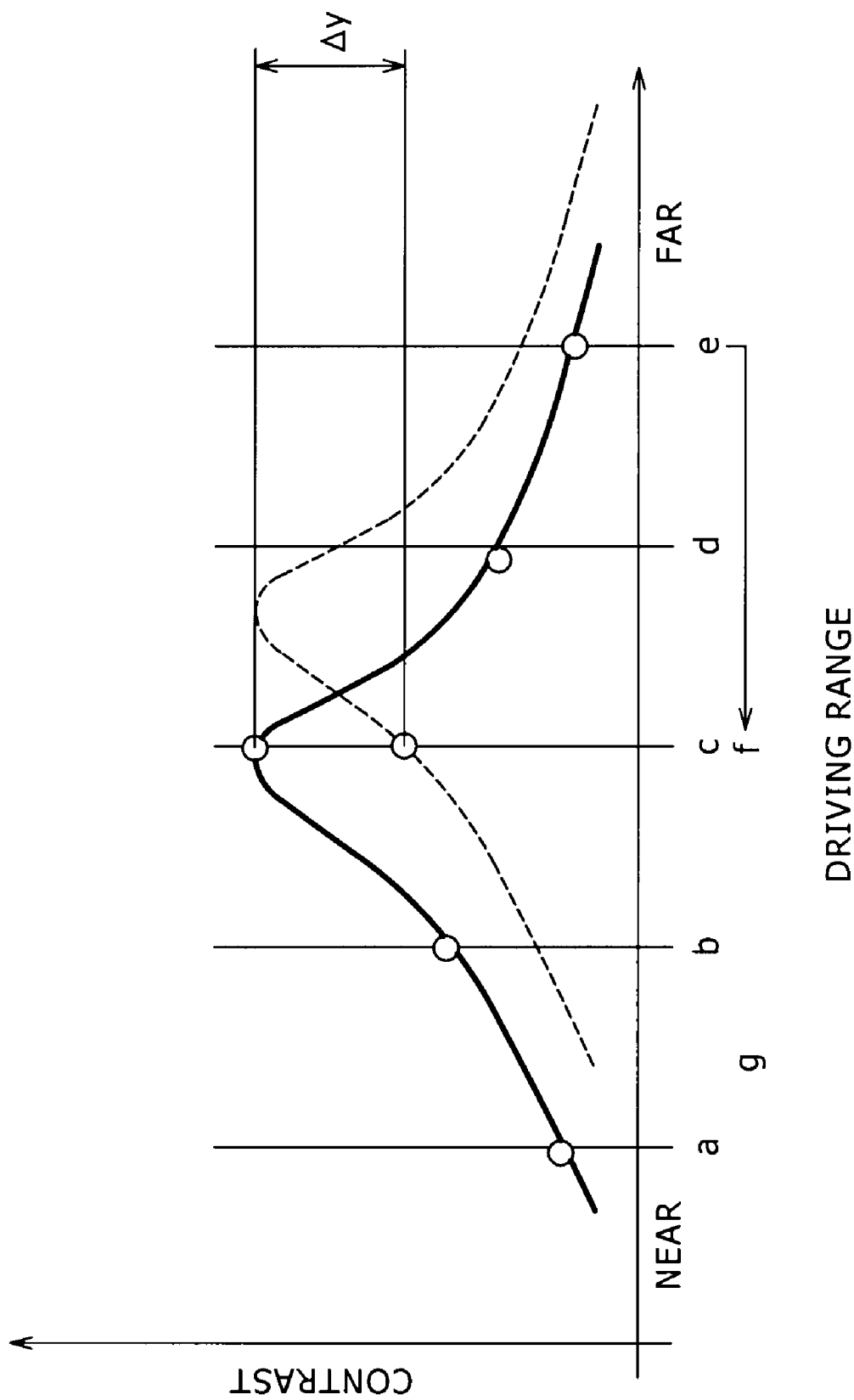
FIG. 14 is a diagram to be referred to in description of a typical process of acquiring second evaluation values by moving the focus lens.
Figure 15:
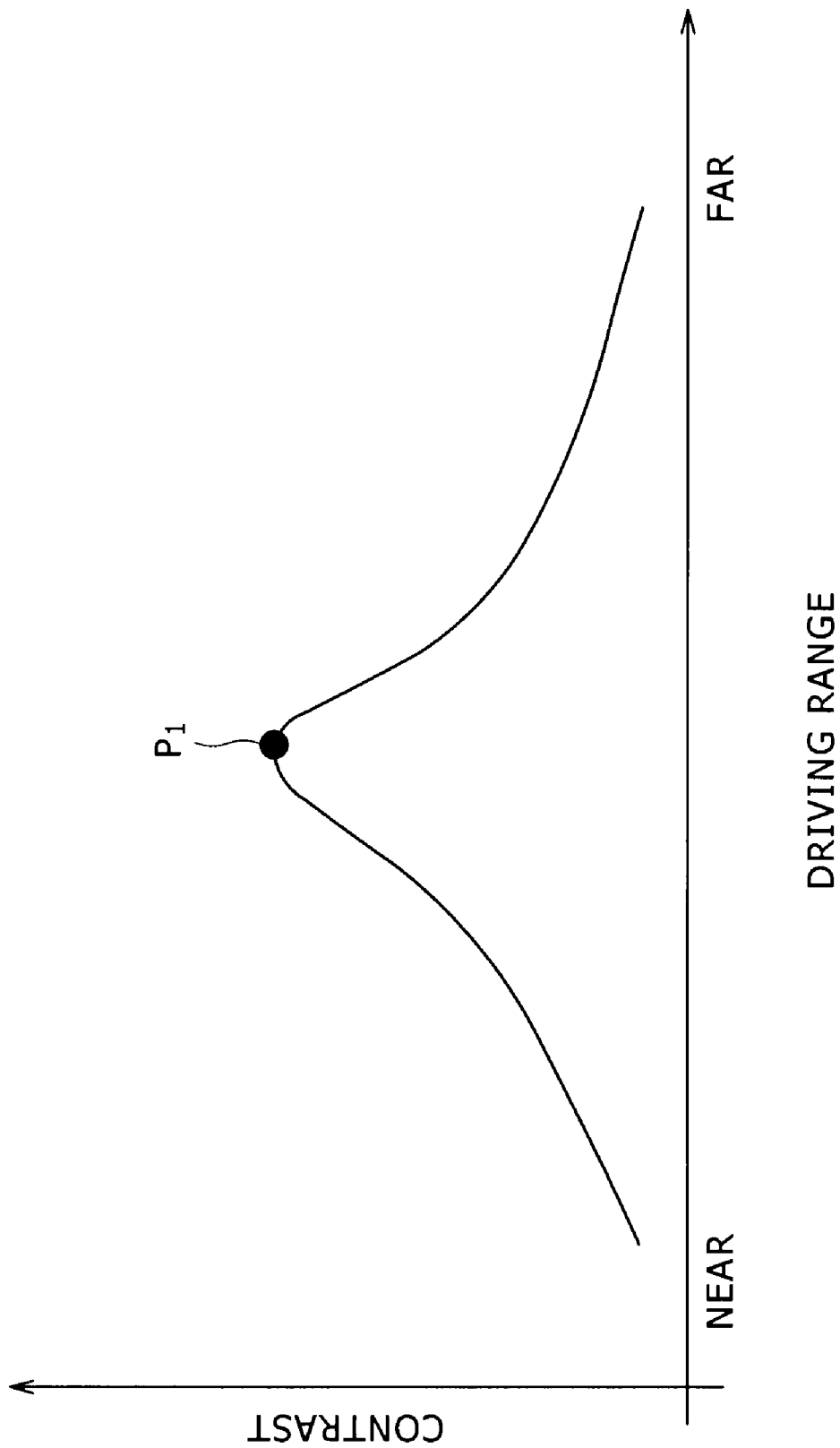
FIG. 15 is a diagram showing another curve representing a relation between the position of a focus lens and an evaluation value obtained at the position.

As a typical example of the latter case, the focus lens 34 is not stopped at the search end position as shown in a diagram of FIG. 14. Instead, right after termination of the search operation, the focus lens 34 is moved toward the start-point side of the focus operation in order to prepare for the next search operation. In the case of the typical example shown in the diagram of FIG. 14, the system controller 41 saves the evaluation value obtained for position (f) which is a position passed through in the operation to move the focus lens 34 from the stopped position back to the position to start the next focus operation. That is to say, instead of stopping the focus lens 34 at position (e) and acquiring a second evaluation value for position (e), second evaluation values are acquired while the focus lens 34 is moving. In this case, the system controller 41 computes a difference between a second evaluation value acquired at focus position (f) and a first evaluation value acquired in the immediately preceding search operation at focus position (c) corresponding to focus position (f) and takes the computed difference as the evaluation-value difference Δy cited before. That is to say, the evaluation-value difference Δy is computed on the basis of a difference between a second evaluation value acquired at focus position (f) during the second period and a first evaluation value acquired in the immediately preceding search operation carried out during the first period at focus position (c) corresponding to focus position (f).

In addition, in the embodiment described above, the function f(x) can be approximated in linear approximation making use of straight lines. However, it is possible to provide a configuration in which, depending on the performance of the image pickup apparatus 10, second-order (quadratic) or third-order approximation can be applied to the function f(x) in a process of approximating the function f(x) in order to improve the precision of a process to infer the velocity of the subject of the image pickup operation.

In the embodiment explained above, the series of processes described previously can each be carried out by hardware, execution of software or a configuration combining both hardware and execution of software. If a series of processes described above is carried out by execution of software, programs composing the software can be installed into a memory employed in a computer embedded in dedicated hardware from typically a network or a removable recording medium and executed to carry out the processes. As an alternative, the programs can be installed in a memory employed in a general-purpose computer which is capable of carrying out various kinds of processing and executed to carry out the processes.

Instead of installing the programs into the general-purpose computer, the programs can also be stored (or recorded) in advance in the general-purpose computer in a recording medium employed in the computer. Typical examples of the recording medium employed in the general-purpose computer are a hard disc or a ROM (Read Only Memory).

As described above, the programs may be installed in a memory employed in the general-purpose computer from a removable recording medium which is used for storing the programs in advance temporarily or permanently. Typical examples of the removable recording medium are a flexible disc, a CD-ROM (Compact Disc ROM), an MO (Magnetic Optical) disc, a DVD (Digital Versatile Disc), a magnetic disc and a semiconductor memory. The programs stored in advance in the removable recording medium can be presented to the user as the so-called package software.

In addition to installing the programs in a memory employed in a general-purpose computer from a removable recording medium, the programs can be installed in the memory employed in the computer from a download site by wire communication such as a LAN (Local Area Network) or the Internet, or radio communication. The general-purpose computer receives the programs downloaded from the download site and installs the programs in a recording medium such as the hard disc embedded in the computer.

It is also worth noting that, in this invention specification, steps of each of the flowcharts each described above to serve as a flowchart representing a series of processes performed in the embodiment can be carried out not only in a pre-prescribed order along the time axis, but also concurrently or individually in accordance with the processing performance of the image pickup apparatus 10 for carrying out the process or in accordance with necessity.

The present application contains subject matter related to that disclosed in Japanese Priority Patent Application JP 2008-167669 filed in the Japan Patent Office on Jun. 26, 2008, the entire content of which is hereby incorporated by reference.

In addition, it should be understood by those skilled in the art that a variety of modifications, combinations, sub-combinations and alterations may occur, depending on design requirements and other factors insofar as they are within the scope of the appended claims or the equivalents thereof.

What is claimed is:

1. An image pickup apparatus comprising:
an in-focus operation section configured to drive a focus lens to move over a predetermined driving range to detect evaluation values, each of the evaluation values representing a contrast strength of an image signal generated by an image pickup operation of a subject from a plurality of predetermined focal positions, the in-focus operation section finding an in-focus position of said focus lens based on the evaluation values; and
a detector configured to acquire
  first evaluation values obtained for each of said predetermined focal positions during a first period of driving said focus lens over said predetermined driving range, and
  a second evaluation value obtained for at least one of said predetermined focal positions during a second period between the end of said first period and a process carried out by said in-focus operation section to find said in-focus position of said focus lens on the basis of said first evaluation values, and
a change measurement section configured to measure an evaluation difference as a difference between said second evaluation value and a first evaluation value corresponding to the at least one of said predetermined focal positions of said second evaluation value, and
determine a velocity of the subject based on the evaluation difference,
wherein said in-focus operation section determines a next driving range of said focus lens on the basis of said in-focus position found from said first evaluation values and using the velocity of the subjected determined based on the evaluation difference.

2. The image pickup apparatus according to claim 1, further comprising:
a movement-distance inference section configured to use straight lines to linearly approximate distribution of said first evaluation values and infer a direction of a movement made by said subject on the basis of said straight lines and said evaluation difference,
wherein said in-focus operation section determines the next driving range of said focus lens on the basis of said in-focus position found from said first evaluation values and on the basis of said direction of said movement made by said subject.

3. The image pickup apparatus according to claim 1, further comprising:
a movement-distance inference section configured to infer the distance of a movement made by said subject in said second period on the basis of distribution of said first evaluation values and said evaluation difference,
wherein said in-focus operation section determines the next driving range of said focus lens on the basis of said in-focus position found from said first evaluation values and on the basis of said distance of said movement made by said subject.

4. The image pickup apparatus according to claim 1, wherein said detector acquires said second evaluation value at a position at which said focus lens is stopped after said first period.

5. The image pickup apparatus according to claim 1, wherein the next driving range is proportional to twice the velocity of the subject.

6. The image pickup apparatus according to claim 5, wherein a center of the next driving range is located based on an estimated position of the subject.

7. An image pickup apparatus comprising:
an in-focus operation section configured to drive a focus lens to move over a driving range determined in advance in order to detect evaluation values each representing a strength of the contrast of an image signal generated based on a subject of an image pickup operation from a plurality of positions determined in advance and find an in-focus position of said focus lens on the basis of said evaluation values;
a detector configured to acquire
first evaluation values obtained for said positions determined in advance during a first period of driving said focus lens to move over said driving range determined in advance, and
second evaluation values obtained for at least one of said positions determined in advance during a second period between the end of said first period and a process carried out by said in-focus operation section to find said in-focus position of said focus lens on the basis of said first evaluation values;
a change measurement section configured to measure a change of said evaluation value on the basis of said second evaluation value and said first evaluation value obtained for the position of said second evaluation value;
a movement-distance inference section configured to infer the distance of a movement made by said subject in said second period on the basis of distribution of said first evaluation values and said change of said evaluation value; and
an image-pickup-operation subject velocity inference section configured to compute
a first image-pickup-operation subject velocity V based on a change exhibited by said in-focus position in a repetition period from the start of an operation to drive said focus lens to move to the start of an operation to drive said focus lens to move in order to compute the next in-focus position, and
a second image-pickup-operation subject velocity $V_{new}$ based on a movement distance ($\Delta x$) of said subject,
wherein, by making use of expressions (1), (2) and (3) described as follows:

$$V \times V_{new} < 0 \quad (1)$$

$$|\Delta x| < Thr1 \quad (2) \text{ and}$$

$$|V - V_{new}| < Thr2 \quad (3)$$

where reference notation Thr1 denotes a first threshold value Thr1 set in advance whereas reference notation Thr2 denotes a second threshold value Thr2 set in advance,
said in-focus operation section
decreases said driving range of said focus lens if said expression (1) is not satisfied and said expression (2) involving said first threshold value Thr1 or said expression (3) involving said second threshold value Thr2 is satisfied, or
does not change said driving range of said focus lens if said expression (1) is not satisfied and said expression (2) or said expression (3) is not satisfied, and
said in-focus operation section determines a next driving range of said focus lens on the basis of said in-focus position found from said first evaluation values, said change of said evaluation value, and said distance of said movement made by said subject.

8. The image pickup apparatus according to claim 7, wherein said in-focus operation section increases said driving range of said focus lens if said expression (1) is satisfied.

9. A focus control method comprising:
acquiring first evaluation values each representing a contrast strength of an image signal generated by an image pickup operation of a subject from a plurality of predetermined focal positions during a first period of driving a focus lens to move in a predetermined driving range;
acquiring a second evaluation value obtained for at least one of said predetermined focal positions during a second period between the end of said first period and a process carried out by an in-focus operation section to find an in-focus position of said focus lens based on said first evaluation values;
measuring an evaluation difference as a difference between said second evaluation value and a first evaluation corresponding to the at least one of said predetermined focal positions of said second evaluation value;
determining a velocity of the subject based on the evaluation difference; and
determining the next driving range of said focus lens by said in-focus operation section on the basis of said in-focus position found from said first evaluation values and the velocity of the subject determined based on the evaluation difference.

10. A non-transitory computer-readable medium storing computer readable instructions thereon, the computer-readable instructions when executed by a computer cause the computer to perform a method comprising:
acquiring first evaluation values each representing a contrast strength of an image signal generated by an image pickup operation of a subject from a plurality of predetermined focal positions during a first period of driving a focus lens to move in a predetermined driving range;
acquiring a second evaluation value obtained for at least one of said predetermined focal positions during a second period between the end of said first period and a process carried out by an in-focus operation section to find an in-focus position of said focus lens based on said first evaluation values;
measuring an evaluation difference as a difference between said second evaluation value and a first evaluation corresponding to the at least one of said predetermined focal positions of said second evaluation value;
determining a velocity of the subject based on the evaluation difference; and
determining the next driving range of said focus lens by said in-focus operation section on the basis of said in-focus position found from said first evaluation values and the velocity of the subject determined based on the evaluation difference.

11. An image pickup apparatus comprising:
means for driving a focus lens over a predetermined driving range to detect evaluation values each representing a contrast strength of an image signal generated by an image pickup operation performed on a subject from a plurality of predetermined focal positions;

means for finding an in-focus position of said focus lens on the basis of said evaluation values;

detection means for acquiring
- first evaluation values obtained for each of said predetermined focal positions during a first period of driving said focus lens to move over said predetermined driving range, and
- a second evaluation value obtained for at least one of said predetermined focal positions during a second period between the end of said first period and a process carried out by said in-focus operation means to find said in-focus position of said focus lens on the basis of said first evaluation values; and change measurement means for measuring an evaluation difference as a difference between said second evaluation value and a first evaluation value corresponding to the at least one predetermined focal positions of said second evaluation value; and means for determining a subject velocity based on the evaluation difference, wherein said in-focus operation means determines a next driving range of said focus lens on the basis of said in-focus position found from said first evaluation values and the subject velocity determined based on the evaluation difference.

* * * * *